Oct. 25, 1927. 1,646,819
G. HUTCHINSON
INDICATOR DEVICE FOR INSTRUMENTS
Filed Sept. 14, 1925 2 Sheets-Sheet 1
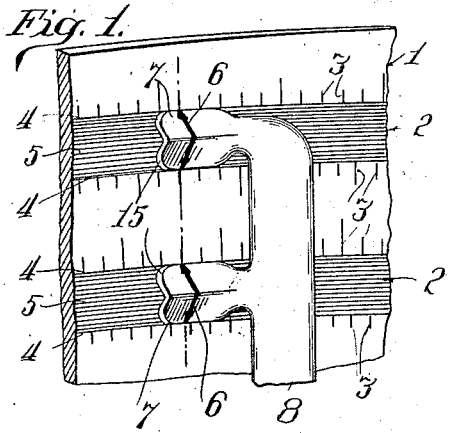
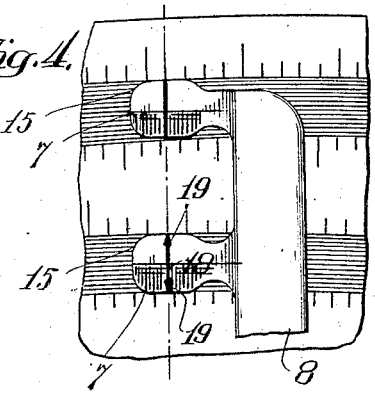
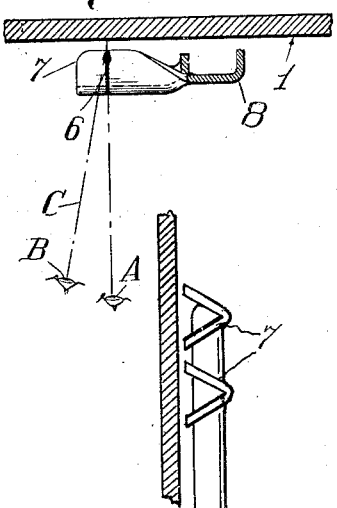
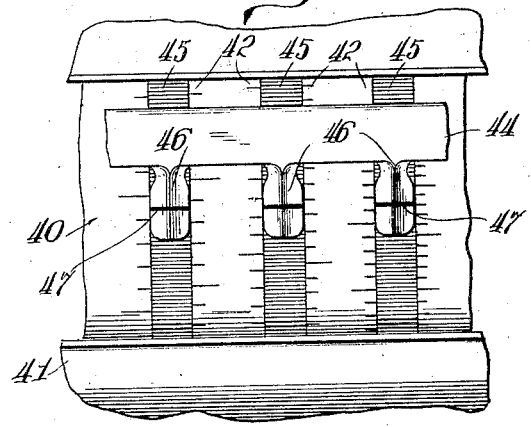
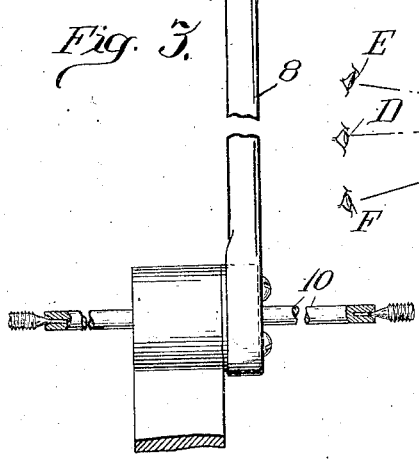
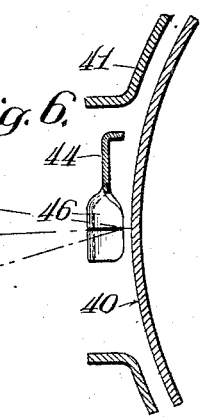
Inventor
George Hutchinson
By
Attorney Oct. 25, 1927.  1,646,819
G. HUTCHINSON
INDICATOR DEVICE FOR INSTRUMENTS
Filed Sept. 14, 1925   2 Sheets-Sheet 2
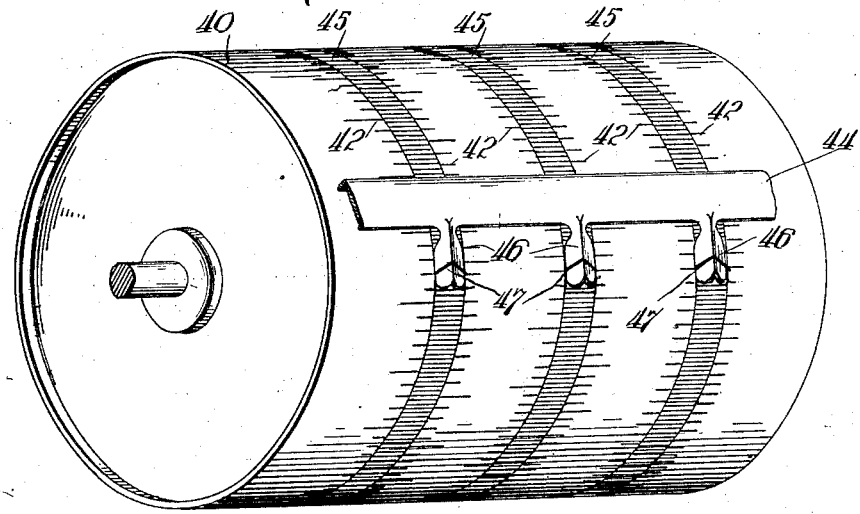
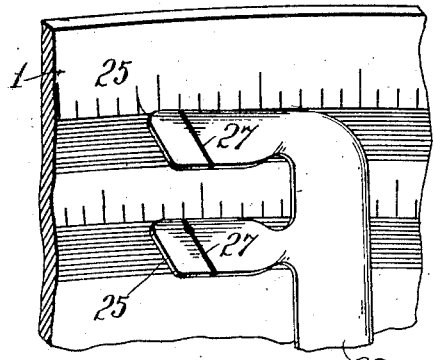
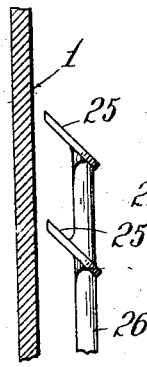
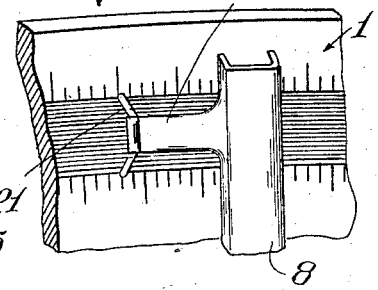
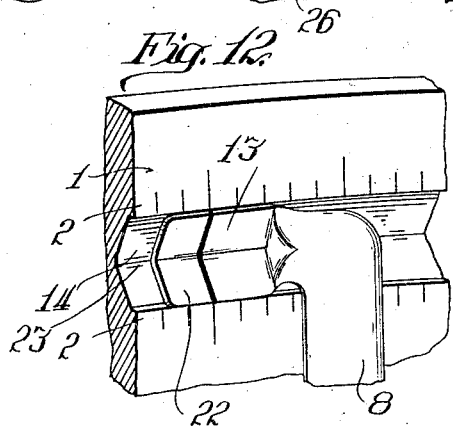
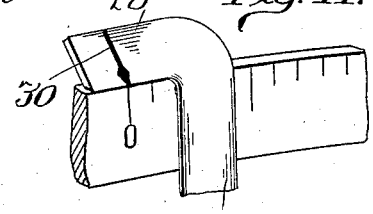
Inventor
George Hutchinson
By B. Singly
Attorney.

Patented Oct. 25, 1927.

1,646,819

UNITED STATES PATENT OFFICE.

GEORGE HUTCHINSON, OF SHEBOYGAN, WISCONSIN, ASSIGNOR TO HUTCHINSON SCALE COMPANY, OF SHEBOYGAN, WISCONSIN, A CORPORATION OF WISCONSIN.

INDICATOR DEVICE FOR INSTRUMENTS.

Application filed September 14, 1925. Serial No. 56,373.

This invention relates to improvements in indicator devices for instruments and particularly in indicator devices for computing scales.

It is an object of the invention to avoid parallactic error in the reading of the values on the chart by arranging different portions of the indicating element at different distances from the surface of the chart. If the chart is being read, while these different portions appear in alinement with each other or while the elements themselves appear in alinement, the end point of the indicating element to be read will appear directly in opposition to the point of interest.

The invention also has the object of providing an indicating element which slopes towards the plane of the chart.

Another object of the invention is to associate a single indicating element in sloping arrangement with a plurality of rows of graduations on the chart without sacrificing accuracy in the reading.

Owing to the different portions of the indicating element being located at different distances from the surface of the graduations, each indicating element will define a plane at right angle to the chart, which plane may be defined as non-parallactic, as parallactic error is excluded when the eye of the observer is located in said plane.

The present invention therefore also has the object of making it easier for the observer to select the proper viewpoint by indicating to him through a definite relation of the indicating elements with respect to the graduation marks on the chart whether his eye is located in the non-parallactic plane or not.

With these and other objects in view, embodiments of the invention are illustrated in the accompanying drawings, in which:

Figure 1 is a perspective view of a portion of a chart of a computing scale associated with a plurality of indicating elements on a common support;

Figure 2 is a transverse fragmentary section through said chart and indicating element;

Figure 3 shows a longitudinal sectional view of a chart and a side elevation of several indicating elements;

Figure 4 is a front elevation similar to that of Figure 1 showing modified indicating elements and their support;

Figure 5 is a front elevation of a portion of the chart of a drum scale with a relatively stationary indicating element and support;

Figure 6 is a sectional view through the drum and support of the indicating element;

Figure 7 is a perspective view of the drum with a stationary common support for modified indicating elements;

Figure 8 is a perspective view of a chart with a modified arrangement and indicating elements provided for this purpose;

Figure 9 is a section through the chart of Figure 8, and shows the modified indicating elements and their support in side elevation;

Figures 10, 11 and 12 are perspective views of other modifications of the indicating elements and the charts associated with the same.

In the reading of instrument charts, and particularly in the reading of charts of computing scales, errors are frequently introduced through parallax. Where an indicating element extends parallel or equidistant to the surface of the chart and the observer selects his viewpoint in different parallactic planes, as for instance in planes which are at different distances towards one side of the indicating element, the reading will be different, dependent upon the distance between the eye and the non-parallactic planes. The closer the eye is to the non-parallactic plane the more accurate the reading will be; the larger the distance of the eye from the non-parallactic plane the greater will be the error made by the improper selection of the viewpoint.

Where several indicating elements are located in the same plane at right angle to the surface containing the graduations, the elements having different distances from said surface, the reading from any parallactic plane for these different indicating elements will also be different. But if a viewpoint is selected in which the readings of these several indicating elements, at different distances but in the same vertical plane with respect to the surface of graduations, are the same, then this coincidence of the readings from these different indicating elements is proof that the viewpoint has been selected in the proper non-parallactic plane.

This condition is made use of in the present application by selecting an indicating element which has different portions at different distances from the plane of the surface of graduations. Where a viewpoint is then selected in which the entire indicating element appears to be in alinement with the same graduation, or appears to be exactly parallel to graduations which are parallel, or appears to converge towards the same point towards which graduations converge, the assurance is given that the viewpoint is located in the non-parallactic plane, and in this manner the selection of the viewpoint is greatly facilitated inasmuch as even an unskilled observer by instinctively shifting the viewpoint to a position in which this condition is induced, now has the assurance that the reading is an accurate and correct reading.

In order to arrange different portions of an indicating element at different distances from the surface in which the graduations are marked, in the present application the indicating elements are disposed at angles to the plane of the surface of the graduations and preferably are arranged in such manner that they slope towards the surface of the graduations, the reading or terminal point of each indicating element being moved as close as permissible to the surface of the graduations without interfering with the working clearance required for maintaining relative movement between the chart and the element.

In the embodiment of the invention illustrated in Figures 1, 2 and 3 a chart 1 of the fan-type, as for instance used in computing scales, is provided with a plurality of rows of graduations 2, the graduations comprising designations 3 and also marking lines 4 and these rows are arranged in pairs, the pairs of each row 2 being separated by a blank zone 5 the margins of which are defined by lines concentric to the rows of graduations and on which the butts of the marking lines 4 are located. The zones 5 between these graduations may be of the same color as the background of the chart or they may be of a color contrasting therewith, as indicated in Figure 1, to facilitate the reading since owing to this contrasting color surface the eye is more readily directed to the proper location to be read than with charts in which the entire surface is of one color.

The indicator device furthermore comprises a plurality of indicating elements 6 which in the present embodiment are carried by fingers 7 projecting laterally from a common support or pointer bar 8. This pointer bar is shown in Figure 3 to be fixed to a spindle 10 supported by trunnion screws 11, but obviously any other suitable support may be selected. It had been proposed heretofore to utilize pointer bars with projecting fingers as carriers of indicating elements, but it was the edge of these projecting fingers which directed the eye of the observer to a point on the chart, while according to the present invention, and as set forth in my copending application Serial No. 56,372, the fingers 7 serve as carriers of indicating elements 6 which have an actual dimension transversely to their length and which preferably appear as lines spaced from the edges of the fingers, and therefore offset from a background which again has a color contrasting with that of the indicating elements.

The projecting fingers 7, Figures 1, 2 and 3, are shaped to occupy two planes, each in sloping and therefore non-parallel relation to the surface on which the graduations appear. Owing to this arrangement the indicating elements 6 carried by these fingers also will be arranged at angles to the surface of the graduations, and hence different portions of the indicating element are located at different distances from the surface of the chart.

In the embodiments illustrated in Figures 1 to 4, as well as in Figures 5 to 7 and in Figures 10 and 12, the projecting fingers are gabled and therefore present an apex extending longitudinally of the fingers, the indicating elements being transversely arranged on these fingers. Each of these fingers, therefore, may be said to carry two indicating elements, one in cooperation with one row 2 of graduations and the other one in association with another row 2. These indicating elements slope in direction towards the surface of the chart on which the graduations appear in such manner that the operative or reading ends of the indicating elements have approximately the same distance from the plane of the chart.

While in Figures 1 to 4 inclusive and also in Figure 10, the two portions of the indicating elements sloping towards the chart form a V with its apex directed away from the chart, the embodiment shown in Figure 12 discloses a finger 13 which projects into a groove or zone 14 depressed between adjacent rows 2 of a pair of graduations, but in each of these embodiments the ends of the indicating elements 6 lie closely as possible to the line which connects the butts of all of the marking lines 4 of the same row 2.

In the embodiments shown in Figures 1 and 4, the fingers 7 projecting from the pointer bar 8 terminate in ends 15 which form rounded corners with the lateral edges of the fingers.

Figure 2 illustrates diagrammatically the proper selection of the viewpoint. An eye placed at A will obviously see the indicating element 6 in alinement with a graduation and the indicating element will appear as a straight line. This is the viewpoint in the non-parallactic plane. An eye placed at B, however, will see the gabled indicating element as a broken line, and the ray C will strike the chart not in the proper place.

In the embodiments illustrated in Figures 1 and 4, the indicating elements 6 appear as lines at a considerable distance from the ends, whereby the reading is greatly facilitated. Figure 4 illustrates the condition that upon viewing the indicating elements in a non-parallactic plane, the indicating elements appear as a straight line which may be in alinement with the marking lines with the chart, or which may be located between adjacent marking lines depending upon the position of the pointer, and will then represent a line having the same relation to the center point of the chart as the marking lines 4 themselves. The selection of this viewpoint in a non-parallactic plane will furthermore be facilitated by the fact that if viewed in this plane all of the indicating elements on all of the fingers will appear as being in alinement with each other as indicated in Figure 4 with respect to two fingers. The reading end of the indicating element 18 is accentuated by means of arrow heads 19 which appear in a strong contrast to the background of the finger, the last named background again being clearly offset from the background of the chart formed by the zone 5.

In the embodiment of the fan chart and pointer as shown in Figure 10, a projecting finger 20 also is deflected from the plane of the pointer 8 and terminates in an indicating element 21 which is also gabled so as to have the general appearance of a V with the apex directed away from the surface of the chart, this indicating element 21 being here shown as a short piece of wire or sheet metal secured to the end of the finger 20 and projecting laterally beyond both ends of the finger, the ends of the indicating elements again being as close to the line of the butts of the marking lines as permissible under maintenance of the necessary clearance for movement.

In the embodiment shown in Figure 12 the finger 22 deflected from the plane of the pointer 8 is inverted, the V being directed away from the observer, so that the apex of the V formed by the gabled finger travels along the V-shaped bottom of a groove 23 between two rows 2 of graduations. Here also the indicating element 6 is spaced from the free edge of the finger 22 and is offset from a background formed by the surface or area of the finger.

In the embodiment illustrated in Figures 8 and 9, the indicating elements comprise lines 27 which are inclined in one direction only towards the chart 1, the sloping fingers 25 projecting laterally from the pointer 26. The lines 27 are continued across the thickness of the respective fingers, whereby a V is formed by the two sections of these lines, as more clearly shown in Fig. 8.

In the embodiment illustrated in Figure 11 a single pointer finger 28 is deflected from the plane of the pointer bar 29 and also is provided with an indicating element 30 at a suitable distance from the edge of the finger.

In all of these embodiments the indicating elements when viewed in a parallactic plane, as for instance indicated by the viewpoint B in Figure 2, will appear as elements which are not in alinement with each other, and which would also appear as elements in angular relation to the graduation marks on the chart, while if viewed in a parallactic plane as indicated in Figure 2 at A, the indicating elements will appear as straight lines, all of them in alinement with each other and also in alinement with the general direction of the markings on the chart.

In the modifications of Figures 5 to 7 the utilization of the indicator device in connection with a drum is shown. The movable drum 40 surrounded by the stationary casing 41 also is provided with a plurality of pairs of rows 42 of graduation marks, the rows in each pair being separated by a blank zone 45. A slot in the casing 41 permits the reading of the graduations on the drum chart with respect to a stationary pointer bar 44 supported longitudinally of said slot. This stationary pointer bar 44 again is provided with a plurality of laterally projecting fingers 46 deflected from the plane of the pointer bar and shown as gabled fingers sloping from their axial line in a direction towards the surface on which the graduations appear. Here also, as shown in Figure 5, an observation of the indicating elements 47 in a non-parallactic plane, as from the point D, will cause the indicating elements to appear as straight lines in alinement with each other, altho actually these indicating elements occupy in different portions different spaces or distances from the surface of the chart. A viewpoint, as indicated at E or F, however, would present them as broken lines, and the ends of the indicating elements would not seem to overlie the marks to which they actually point. Here also the indicating elements 47 are spaced from the rounded free edges of the fingers 46, which fingers serve as a background of a color contrasting with that of the indicating elements themselves.

I claim:

1. In combination, a chart having rows of graduations, a pointer arm movable relatively to the chart and having a plurality of fingers extending transversely therefrom, an indicating element on each finger and extending transversely thereof, all of said elements lying in a plane at right angle to the surface of the chart, and all of said elements having different portions at different distances from the chart's surface.

2. In combination, a chart having rows of graduations, a pointer arm having a plurality of fingers extending transversely therefrom, an indicating element on each finger extending transversely of the same, the indicating elements being located in a plane at right angle to the surface of the chart, and all of said elements sloping in direction towards the plane of the chart.

3. In combination, a chart having rows of graduations, a pointer bar, fingers on the pointer bar and deflected from the plane of the same to form an angle with the plane of the chart, and indicating elements carried by said fingers.

4. In combination, a chart having a row of graduations and an indicating element having different portions in a single plane at different distances from the surface of the graduations, and adapted when viewed from any point in its non-parallactic plane said plane being at right angle to that surface portion of the chart to which the indicating element points to appear symmetrically disposed about such plane.

5. In combination, a chart having a row of graduations, a pointer arm, fingers projecting laterally from the pointer arm and twisted relatively to the plane defined by the pointer arm, and indicating elements carried by said twisted fingers, said indicating elements being located with respect to the surface of the chart so that when viewed from any point in the non-parallactic plane of the indicating element, said plane being at right angle to the surface portion of the chart to which the indicating element points,—such element appears symmetrically disposed about such plane.

6. In combination, a chart having a row of graduations, a pointer bar made of sheet metal and integral with a plurality of laterally projecting fingers twisted with respect to the plane occupied by the pointer bar, the fingers being provided with indicating elements and having different portions at different distances from the surface of graduations and being so constructed that when viewed from any point in its non-parallactic plane such plane passes through the medial line of such element, the non-parallactic plane being at right angle to the surface portion of the chart to which the respective indicating finger points.

7. In combination, a chart having rows of graduations, and indicating elements, each indicating element being in operative relation to a predetermined number of rows of graduations and having different portions at different distances from the surface of the chart, said indicating elements being located in a common plane in which they are alined and being so constructed that when several indicating elements are viewed together from any point in their common non-parallactic plane they appear as straight line sections in alinement with each other.

8. In combination, a chart having a pair of equidistant rows of graduations, and an indicating element with a pair of indicating portions sloping in opposite directions towards said rows respectively.

9. In combination, a chart having a pair of rows of designations including graduations including graduation marks with their butts in alinement, and an indicating element sloping towards both lines of butts of the rows of designations.

10. In combination, a chart having a pair of rows of designations, and an indicating element having different portions at different distances from the plane of the chart, and having both of its ends at the same distance from the plane of the chart.

11. In combination, a chart having a pair of rows of graduations with marking lines, the butts of which are directed towards each other, the butts in each row being in alinement and the two rows being separated by a vacant zone on the chart, and an indicating element in predetermined relation to the vacant zone and sloping towards each row of graduations of the pair.

12. In combination, a chart having a pair of rows of graduations spaced from each other by a vacant zone, the butts of the marking lines in each row being in alinement and defining the margin of the zones separating the rows, a pointer bar, a gabled finger projecting transversely from the pointer bar, and an indicating element carried by said gabled finger.

13. In combination, a chart, having a pair of rows of graduations, the graduations including marks with their butts in alinement, and an indicating element comprising two portions sloping towards the chart, such portions together forming a V with its apex directed away from the chart.

14. In combination, a chart having pairs of rows of graduations, and indicating elements, each in operative relation to a pair of rows and comprising two portions sloping in opposite directions towards the surface of the chart, and being so constructed that when viewed together from any point in their common non-parallactic plane they appear as straight line sections in alinement with each other.

15. In combination, a chart having rows of graduations, a pointer bar, fingers on the pointer bar projecting laterally from the same and deflected from the plane of the pointer bar to form an angle with the plane of the chart, and indicating elements carried by said fingers, the individual fingers having surface portions sloping in the same direction with respect to the surface of the chart on all of the fingers respectively.

16. In combination, a chart having rows of graduations, and indicating elements in operative relation to said graduations, the indicating elements being each in a plane at an angle to the surface of the chart, the graduations terminating in alined butts and the indicating elements angularly arranged with respect to the chart being disposed relatively thereto so as to intersect if extended in their own plane the line of the butts.

17. In combination a chart, having rows of graduations, and an indicating element in cooperative relation to said chart in a plane at right angle to the surface of the chart, such element having different portions at different distances from the general plane of the chart and the plane of the indicating element being transverse of said row of graduations.

18. The combination of a chart and an indicator in cooperative relation to said chart, the indicator having a V shaped ridge and an indicating element on the indicator being formed by a line crossing said ridge.

19. The combination of a chart and an indicator in the form of a V shaped ridge with its apex directed away from the chart, an indicating element being formed on the indicator by a line crossing said apex at a right angle.

GEORGE HUTCHINSON.